United States Patent
Kato et al.

(10) Patent No.: US 6,517,118 B2
(45) Date of Patent: Feb. 11, 2003

(54) HOSE DEVICE FOR FUEL TRANSPORTATION

(75) Inventors: Kota Kato, Nagoya (JP); Kazutaka Katayama, Komaki (JP); Takahiro Nishiyama, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/059,161

(22) Filed: Jan. 31, 2002

(65) Prior Publication Data

US 2002/0140225 A1 Oct. 3, 2002

(30) Foreign Application Priority Data

Feb. 1, 2001 (JP) ........................................ 2001-025946

(51) Int. Cl.[7] ................................................ F16L 39/00
(52) U.S. Cl. .................... 285/222.1; 285/319; 285/918; 285/423; 285/351
(58) Field of Search ............................... 285/55, 222.1, 285/319, 351, 423, 918

(56) References Cited

U.S. PATENT DOCUMENTS

| | | | | |
|---|---|---|---|---|
| 4,657,285 A | * | 4/1987 | Akiyama et al. | 138/103 |
| 5,174,611 A | * | 12/1992 | Byrd et al. | 285/305 |
| 5,428,096 A | * | 6/1995 | Fukunaga | 524/439 |
| 6,357,802 B1 | * | 3/2002 | Nozato et al. | 264/135 |
| 2002/0084654 A1 | * | 7/2002 | Katayama et al. | 285/423 |

FOREIGN PATENT DOCUMENTS

| | | | |
|---|---|---|---|
| EP | 1087166 | * | 3/2001 |
| EP | 1113208 | * | 7/2001 |

* cited by examiner

Primary Examiner—Eric K. Nicholson
(74) Attorney, Agent, or Firm—Armstrong, Westerman & Hattori LLP (57) ABSTRACT

A hose device for fuel transportation having superior methanol permeation resistance, methanol resistance, non-extractability with methanol, water resistance, heat resistance, pressure resistance, etc., when methanol is used as a fuel. The hose device for fuel transportation comprises a hose main body having a three-layer structure composed of an innermost layer made of a resin having methanol permeation resistance, an intermediate layer, and an outermost layer, and a quick connector mounted on the end portion of the hose main body. The aforementioned quick connector is composed of a housing section and a pair of O-rings. The aforementioned housing section is composed of a material having methanol permeation resistance, one end portion of the housing section is formed as an insert portion to be inserted into the aforementioned hose main body, and the other end portion is formed as a container portion for containing an engagement target member therein.

24 Claims, 2 Drawing Sheets

HOSE DEVICE FOR FUEL TRANSPORTATION

BACKGROUND OF THE INVENTION

1. Field of the Invention

The present invention relates to a hose device for fuel transportation. In particular, the present invention relates to a hose device for fuel transportation used for transporting a methanol fuel, the device composed of a hose and a connector.

2. Description of the Art

Figure 4:
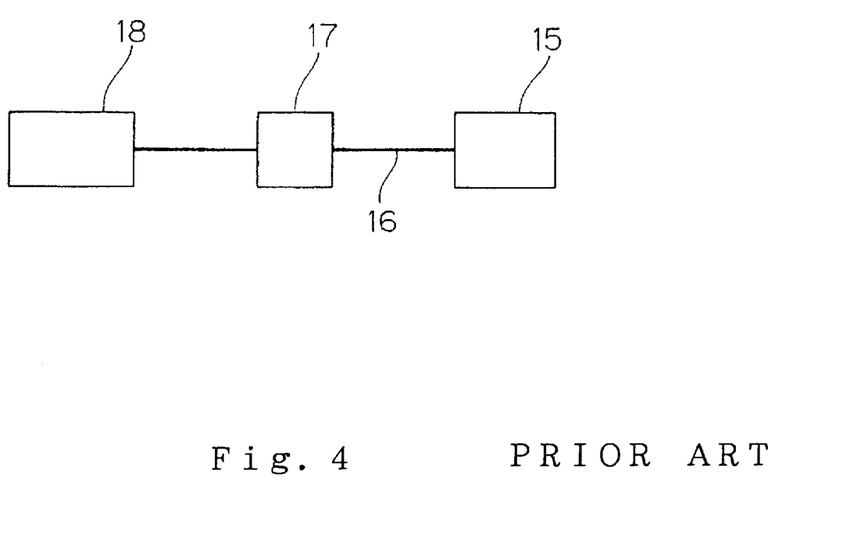
FIG. 4 is a schematic diagram of a methanol supply system of a fuel-cell vehicle using methanol as a fuel.

In recent years, accompanying environmental issues and depletion issues of petroleum, developments of fuel-cell vehicles as next-generation vehicles have been actively pursued. The fuel-cell vehicle uses hydrogen gas as an ultimate fuel. However, since hydrogen is a gas, there are problems in handling and in construction, maintenance, and the like of the infrastructure. Therefore, vehicle-mounted systems, in which liquid fuels are reformed into hydrogen, so as to generate hydrogen, have been researched. As the liquid fuel, methanol has been primarily researched because methanol can be reformed into hydrogen with relative ease. The system using the aforementioned methanol as a fuel is, for example, a system in which methanol is transferred from a methanol storage tank 15 to a reformer 17 through a fuel hose 16, and hydrogen produced by reformation with the reformer 17 is transferred to a fuel-cell stack 18 and, therefore, is made available for electric power generation, as shown in FIG. 4. Furthermore, the aforementioned methanol has been researched as a fuel alternative to gasoline because of a cleaner exhaust gas, and some of them have been in practical use.

However, when fuel transportation hoses generally used for gasoline are used for a methanol fuel, since methanol has permeability higher than that of gasoline, methanol permeates through hoses by a large degree. From the viewpoint of environmental issues, in California, USA, there is a regulation of HC (hydrocarbon gas) emission from vehicles as of now, and there is a tendency to get tougher regulations. Likewise, in Japan and Europe, regulations of HC emission similar to that in California have become into operation. Therefore, the permeation of methanol through the hose is a significant problem, and the amount of permeation thereof must be suppressed. Furthermore, the problem of methanol permeation relates to not only the fuel transportation hose. There are fears of problems due to methanol permeation similar to that described above with respect to a joint portion of a methanol storage tank and a hose, and a joint portion of the hose and the reformer.

In addition to the requirement for the methanol permeation resistance as described above, the following characteristics have been required. That is, gasoline and methanol have different polarities from each other, and the hose is swelled with methanol by a large degree, so that degradation of the hose is accelerated. There are fears of problems in that, for example, significant amounts of materials are extracted from the components used for forming the hose, and these extracted materials may cause malfunctions, such as clogging, or the extracted materials are transferred to the reformer together with methanol so as to cause degradation of the performance of the reformer due to poisoning by the extracted materials. Consequently, superior methanol resistance and superior non-extractability with methanol are required for the hose. Since methanol exhibits hydrophilicity, there is a high possibility that the content of water increases by a large degree. Therefore, the hose is required to have water resistance. When methanol is used as a fuel, as described above, the fuel transportation hose is joined with the reformer, and the temperature in the periphery of the reformer becomes very high, so that heat resistance is required for the hose. Furthermore, since the energy density of methanol is somewhat lower than that of gasoline, there is a possibility that the supply pressure of methanol may be increased in order to increase the amount of flow and, therefore, the hose is required to have significant pressure resistance.

SUMMARY OF THE INVENTION

The present invention was made in consideration of the aforementioned circumstances. Accordingly, it is an object of the present invention to provide a hose device for fuel transportation having superior methanol permeation resistance, methanol resistance, non-extractability with methanol, water resistance, heat resistance, pressure resistance, etc., when methanol is used as the fuel being transported.

In order to achieve the aforementioned object, a hose device for fuel transportation according to the present invention comprises a hose main body, in which at least the innermost layer is made of a resin having methanol permeation resistance, and a quick connector mounted on at least one end portion of the hose main body. The hose device has a structure in which the aforementioned quick connector is composed of a nearly cylindrical housing section and a pair of O-rings, the aforementioned housing section being composed of a material having methanol permeation resistance. In the connector, one end portion of the housing section is formed as an insert portion to be inserted into the aforementioned hose main body, the other end portion being formed as a container portion for containing an engagement target member therein. A first O-ring of the pair of O-rings for the connector is composed of at least one of fluororubber and ethylene-propylene rubber and is mounted on the inner radius surface, at the hose insert portion side, in the aforementioned container portion, and a second O-ring of the pair of O-rings is composed of butyl rubber and is mounted on the inner radius surface, at the outlet side, in the aforementioned container portion.

That is, the inventors of the present invention carried out research regarding fuel transportation hoses having superior methanol permeation resistance, methanol resistance, non-extractability with methanol, water resistance, heat resistance, and pressure resistance when methanol is used as the fuel, and in addition to the above, earnestly carried out research regarding connectors themselves mounted on the aforementioned hoses in order to join the hoses with other component. As a result, it was found out that by adopting the configuration in which at least the innermost layer of the hose main body was made of the resin having methanol permeation resistance, and in the quick connector mounted on at least one end portion of the hose main body, the housing section is formed from a material having methanol permeation resistance, the first O-ring is composed of at least one of fluororubber and ethylene-propylene rubber is mounted on the inner radius surface, at the hose insert portion side, in the container portion of the aforementioned quick connector, and the second O-ring is composed of butyl rubber mounted on the inner radius surface, at the outlet side, in the aforementioned container portion, each of the hose main body and the quick connector exhibited superior methanol permeation resistance, methanol resistance, non-extractability with methanol, and water resistance. Further, since two O-rings made of different materials are provided in the container portion of the quick connector, the joint portion of the hose and the quick connector have methanol resistance, and in addition to this, high airtightness. As a consequence, the present invention has been achieved.

When the material having methanol permeation resistance and constituting the aforementioned housing section is a stainless steel, the methanol permeation resistance is further improved.

When the aforementioned first O-ring is formed from ethylene-propylene rubber produced by peroxide vulcanization without the use of zinc oxide, extraction of zinc by methanol does not occur, and problems such as the degradation of performance of the reformer due to poisoning with the extracted materials can be suppressed.

When the aforementioned first O-ring is formed from ternary fluororubber having a fluorine content of 69% by weight or more, swelling of the fluororubber (FKM) with methanol is suppressed, superior sealing property can be stably ensured, and in addition, the poisoning of the reformer can be suppressed because the FKM has superior non-extractability.

When the resin having methanol permeation resistance and constituting the aforementioned hose main body is a fluororesin, the balance of performance, for example, methanol permeation resistance, is further improved.

When the aforementioned hose main body is a hose having a three-layer structure, in which the innermost layer is composed of conductive ethylene-tetrafluoroethylene copolymer, the intermediate layer is composed of non-conductive ethylene-tetrafluoroethylene copolymer, and the outermost layer is composed of polyamide, problems which may be brought about by static electricity generated when methanol flows tend to be avoided.

DESCRIPTION OF THE PREFERRED EMBODIMENTS

Embodiments according to the present invention will be described below in detail.

Figure 1:
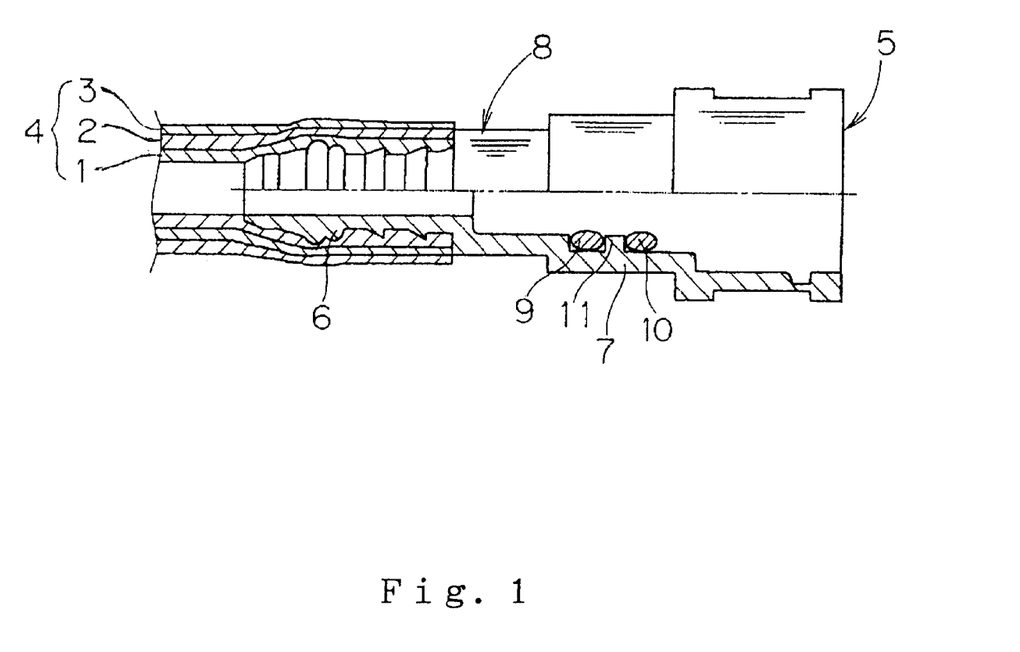
FIG. 1 is a schematic diagram (a part thereof is a sectional view) of a hose device for fuel transportation according to an embodiment of the present invention.

A hose device for fuel transportation according to the present invention has a configuration provided with, for example, a hose main body 4 having a three-layer structure composed of the innermost layer 1, intermediate layer 2, and outermost layer 3, and a quick connector 5 mounted on at least one end portion of the aforementioned hose main body 4, as shown in FIG. 1.

Figure 2:
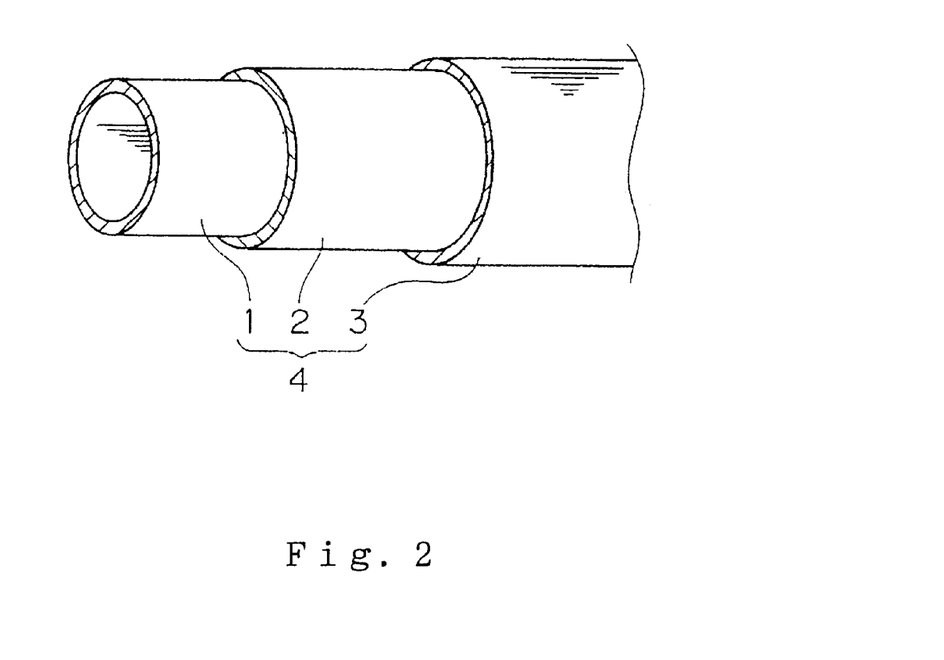
FIG. 2 is a perspective sectional view of a hose main body of a hose device for fuel transportation according to an embodiment of the present invention.

Regarding the aforementioned hose main body 4, the shape and layer structure are not specifically limited as long as the innermost layer 1 is formed from a resin having methanol permeation resistance. Therefore, it may be in a curved shape or bellows shape, as well as linear shape, and it may have a single-layer structure or a multilayer structure composed of at least two layers. An example of such a hose main body 4 includes a hose having a three-layer structure composed of the innermost layer 1, the intermediate layer 2, and the outermost layer 3, as shown in FIG. 1 and FIG. 2.

The material for forming the aforementioned innermost layer is not specifically limited as long as it has methanol permeation resistance, and various macromolecular materials can be used. Specifically, examples of the aforementioned materials include, various fluororesins, for example, ethylene-tetrafluoroethylene copolymer (ETFE), poly (vinylidene fluoride) (PVDF), polytetrafluoroethylene (PTFE), and chlorotrifluoroethylene (CTFE), poly(butylene naphthalate) (PBN), polypropylene (PP), polyethylene (PE), poly(phenylene sulfide) (PPS), etc. Among these, conductive ETFE is used preferably. The aforementioned conductive ETFE can be produced by compounding a conductive material into the ETFE.

Examples of the aforementioned conductive materials include, for example, carbon black and graphite.

Regarding the electrical characteristics of the innermost layer formed from the aforementioned conductive ETFE, the surface resistivity is preferably specified to be $10^6 \Omega$ or less.

The material for forming the aforementioned intermediate layer is not specifically limited, and various macromolecular materials can be used. Specifically, examples of the aforementioned materials include, various fluororesins, for example, ETFE, PVDF, PTFE, and CTFE, PBN, PP, PE, PPS, etc., similarly to those in the aforementioned materials for forming the innermost layer. Among these, ETFE is used preferably when the innermost layer is the conductive ETFE.

The non-conductive ETFE, which is a material for forming the aforementioned intermediate layer, is similar to the ETFE used as the aforementioned material for forming the innermost layer, but in which a conductive material is not compounded.

The material for forming the aforementioned outermost layer is not specifically limited, and various macromolecular materials can be used. Specifically, the examples of the aforementioned materials include polypropylene (PP), polyethylene (PE), nylon 11 (PA11), nylon 12 (PA12), nylon 6 (PA6), nylon 612 (PA612), etc. Among these, the use of PA12 is preferable in consideration of hose strength, cost, flexibility, etc.

The hose main body in the hose device for fuel transportation according to the present invention can be produced, for example, as described below. That is, conductive ETFE, which is a material for forming the innermost layer, and ETFE, which is a material for forming the intermediate layer, are extruded simultaneously, and an adhesion treatment is performed appropriately. Thereafter, polyamide, which is a material for forming the outermost layer, is extruded and, therefore, the desired hose main body having a three-layer structure can be produced.

As described above, the aforementioned hose main body is not limited to a three-layer structure, as long as at least the innermost layer is formed from a resin having methanol permeation resistance. For example, it may have a single-layer structure composed of the aforementioned resin having methanol permeation resistance, or may have a two-layer structure, multilayer structure of at least 4 layers, or a structure in which an adhesive layer is provided between each of the above layers.

The inner diameter of the aforementioned hose main body is generally specified to be 4 to 50 mm in consideration of the use as a fuel transportation hose. Therefore, in consideration of the inner diameter, the outer diameter is generally specified to be 5 to 60 mm. The innermost layer is preferably specified to have a thickness of 0.1 mm or more.

The quick connector 5 mounted on at least one end portion of the aforementioned hose main body by insertion is, as shown in FIG. 1, composed of a housing section 8 made of a material having methanol permeation resistance, including an insert portion 6 to be inserted into the aforementioned hose main body 4 and a container portion 7 to contain an engagement target member therein are formed, a first O-ring 9 mounted on the inner radius surface, at the hose insert portion 6 side, in the aforementioned container portion 7, and a second O-ring 10 mounted on the inner radius surface, at the outlet side, in the aforementioned container portion 7. In FIG. 1, a spacer 11 is provided between the aforementioned first O-ring 9 and second O-ring 10.

The housing section 8 of the aforementioned quick connector 5 is formed from a material having corrosion resistance and methanol permeation resistance, and is preferably formed by a stainless steel.

As the aforementioned stainless steel, although not specifically limited, various SUS members, for example, SUS304 and SUS316, are used more preferably.

As the material for forming the first O-ring 9 mounted on the inner radius surface, at the hose insert portion 6 side, in the aforementioned container portion 7, fluororubber (FKM) and ethylene-propylene rubber (EPM) are used. The aforementioned EPM includes ethylene-propylene-diene rubber (EPDM). Especially preferably, the first O-ring 9 is formed from EPDM (EPM) produced by peroxide vulcanization without the use of zinc oxide or ternary FKM having a fluorine content of 69% by weight or more.

Examples of the material for forming the second O-ring 10 mounted on the inner radius surface, at the outlet side, in the aforementioned container portion 7 include butyl rubbers (IIR), for example, butyl chloride rubber (Cl-IIR) and butyl bromide rubber (Br-IIR).

The rubber materials for forming the aforementioned first O-ring 9 and second O-ring 10 may appropriately contain reinforcing agents, vulcanizing agents, vulcanization promoters, etc., if necessary, as long as those do not degrade the non-extractability.

Examples of the aforementioned reinforcing agents include, for example, carbon black and white carbon.

Examples of the aforementioned vulcanizing agents include, for example, organic peroxides. As described above, regarding the material for forming the first O-ring, preferably, metal ions are not separated from the viewpoint of non-extractability with methanol and, therefore, a method of vulcanization by peroxide vulcanization without the use of zinc oxide is preferable. Examples of the peroxides used for such a peroxide vulcanization include, specifically, dialkyl peroxides, for example, dicumyl peroxide.

The quick connector in the hose device for fuel transportation according to the present invention can be produced, for example, as described below. That is, when the material for forming the housing section is a stainless steel, for example, SUS, the housing section is produced from a SUS pipe by a pipe-enlargement method. The first and second O-rings are produced using the aforementioned respective materials for formation by publicly known conventional methods.

The size of the aforementioned housing section is appropriately specified based on the inner diameter of the hose main body, in which the insertion portion is inserted and mounted, the outer diameter of the pipe contained in the container portion, and the like.

The first O-ring 9 is mounted on the inner radius surface, at the hose insert portion side, in the container portion of the housing section 8 produced as described above, and the second O-ring 10 is mounted on the inner radius surface, at the outlet side, in the container portion of the housing section, so that a quick connector can be produced (refer to FIG. 1).

The hose device for fuel transportation according to the present invention can be produced by mounting the hose insert portion of the quick connector on at least one end portion of the hose main body produced as described above by insertion (refer to FIG. 1).

Regarding the method for engagement of the aforementioned hose main body and the quick connector by insertion, a press-fitting operation using a compressing force of the aforementioned hose is performed. Furthermore, if necessary, an O-ring (not shown) and an elastic coating material can be used between the hose main body and the quick connector.

As the material for forming the aforementioned O-ring, a material similar to the aforementioned materials for forming the first O-ring 9 is used preferably.

As the material for the aforementioned elastic coating material, rubber cement produced by the use of a solvent capable of dissolving the rubber material which is the material for forming the first O-ring is used preferably.

In the aforementioned hose device for fuel transportation, the quick connector is mounted on one end portion of the hose main body. In the present invention, the quick connector may be mounted on at least one end portion of the hose main body, or the quick connector may be mounted on each of both end portions of the hose main body. When methanol permeation resistance and cost reduction are taken into consideration, the quick connector may be mounted on one end portion of the hose main body, and the other end portion may be directly press-fitted into a pipe (not shown), which is an engagement target member, so as to be joined. When the hose main body is directly press-fitted into the pipe, in a manner similar to that in the case where the quick connector is mounted on the hose main body, an O-ring (not shown) and an elastic coating material can also be used between the hose main body and the pipe. As the material for each of the aforementioned O-ring and elastic coating material, a material similar to that described above may be used.

Figure 3:
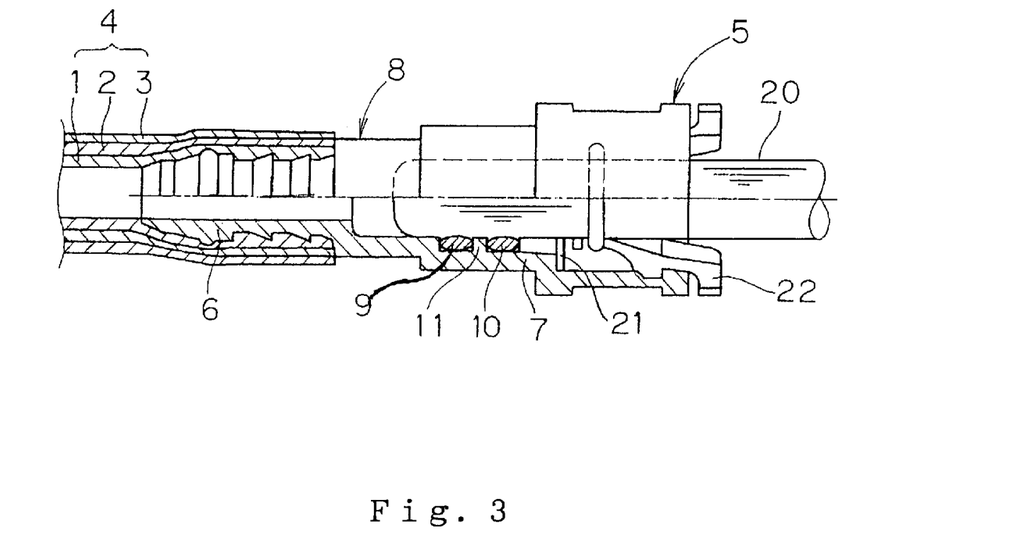
FIG. 3 is a schematic diagram (a part thereof is a sectional view) in which a pipe is engaged with a hose device for fuel transportation according to the present invention.

The aforementioned hose device for fuel transportation is used in the following manner and configuration. That is, as shown in FIG. 3, a pipe 20 is inserted into the container portion 7 of the aforementioned hose device for fuel transportation, and the hose main body 4 and the pipe 20 are joined with the quick connector 5 therebetween. In FIG. 3, a bush 21 is provided on the pipe 20, and this serves as a guide for detecting completion of insertion of the pipe 20 by contact with a start portion of reduced inner diameter in the container portion 7 of the housing section 8. The pipe 20 inserted into the container portion 7 of the housing section 8 is fixed by a retainer 22 provided on the perimeter of the end portion of the pipe 20.

The hose device for fuel transportation according to the present invention thus produced is, for example, used as a fuel transportation hose suitable for joining a methanol storage tank and a reformer of a fuel-cell vehicle using methanol as a fuel, while the use of methanol as an alternative fuel to gasoline has been studied.

More specifically, it can be used for joining respective lines, for example, a fuel supply line, return line, vapor line, fuel inlet connection line, etc., which are different in terms of temperature, pressure, and liquid or vapor.

Next, Examples will be described together with Comparative examples.

EXAMPLE 1

Production of Hose Main Body

Conductive ETFE (manufactured by Asahi Glass Company, Aflon COP CB) as a material for forming the innermost layer and ETFE (manufactured by Asahi Glass Company, Aflon COP C) as a material for forming the intermediate layer were prepared. Layers of these materials were simultaneously extruded, and the surface of the intermediate layer was subjected to an adhesion treatment. Furthermore, PA12 (manufactured by UBE INDUSTRIES LTD, UBESTA) as a material for forming the outermost layer was extruded on the intermediate layer and, therefore, a hose main body (inner diameter of 6 mm and thickness of 1 mm) having a three-layer structure was produced.

Each of the materials for forming the aforementioned innermost layer and intermediate layer was extruded with a co-extruder and, therefore, the innermost layer (inner diameter of 6 mm and thickness of 0.1 mm) and the intermediate layer (thickness of 0.1 mm) were formed. Thereafter, the material for forming the aforementioned outermost layer was extruded in a manner similar to that described above and, therefore, a hose main body (outer diameter of 8 mm) having a three-layer structure composed of the innermost layer, intermediate layer, and outermost layer (thickness of 0.8 mm) was produced (refer to FIG. 2).

Production of Quick Connector

A housing section was produced using a SUS304 pipe by pipe-enlargement. A first O-ring was produced using ternary FKM (manufactured by DAIKIN INDUSTRIES, LTD., DAI-EL G-901) by stamping, and a second O-ring was produced using IIR (manufactured by JSR Corporation, Butyl 365). The first O-ring (inner diameter of 7.65 mm) was mounted on the inner radius surface, at the hose insert portion side, in the container portion of the aforementioned housing section, and the second O-ring (inner diameter of 7.65 mm) was mounted on the inner radius surface, at the outlet side, in the aforementioned container portion, so that a quick connector shown in FIG. 1 was produced.

Production of Hose Device for Fuel Transportation

The aforementioned quick connectors were mounted on the aforementioned hose main body by inserting the hose insertion portion of the quick connector into each of both end portions of the hose main body and, therefore, a hose device for fuel transportation was produced.

EXAMPLE 2

Production of Hose Main Body

A hose main body similar to that in the aforementioned Example 1 was produced.

Production of Quick Connector

A housing section was produced using a SUS304 pipe by pipe-enlargement. A first O-ring was produced using EPDM (manufactured by Sumitomo Chemical Co., Ltd., ESPRENE 553) by stamping, and a second O-ring was produced using a butyl rubber. The first O-ring (inner diameter of 7.65 mm) was mounted on the inner radius surface, at the hose insert portion side, in the container portion of the aforementioned housing section, and the second O-ring (inner diameter of 7.65 mm) was mounted on the inner radius surface, at the outlet side, in the aforementioned container portion, so that a quick connector shown in FIG. 1 was produced.

Production of Hose Device for Fuel Transportation

The aforementioned quick connectors were mounted on the aforementioned hose main body using an elastic coating material by inserting the hose insertion portion of the quick connector into each of both end portions of the hose main body and, therefore, a hose device for fuel transportation was produced.

EXAMPLE 3

Production of Hose Main Body

PBN (manufactured by Toyobo Co., Ltd., PELPRENE PB510) was prepared. This PBN was extruded with an extruder and, therefore, a hose main body (inner diameter of 6 mm and thickness of 1 mm) having a single-layer structure was produced.

Production of Quick Connector

A housing section was produced using a SUS304 pipe by pipe-enlargement. A first O-ring was produced using ternary FKM by stamping, and a second O-ring was produced using a butyl rubber. The first O-ring (inner diameter of 7.65 mm) was mounted on the inner radius surface, at the hose insert portion side, in the container portion of the aforementioned housing section, and the second O-ring (inner diameter of 7.65 mm) was mounted on the inner radius surface, at the outlet side, in the aforementioned container portion, so that a quick connector shown in FIG. 1 was produced.

Production of Hose Device for Fuel Transportation

The aforementioned quick connectors were mounted on the aforementioned hose main body using an elastic coating material by inserting the hose insertion portion of the quick connector into each of both end portions of the hose main body and, therefore, a hose device for fuel transportation was produced.

COMPARATIVE EXAMPLE 1

Production of Hose Main Body

A hose main body similar to that in the aforementioned Example 1 was produced.

Production of Quick Connector

A housing section was produced using PA12 (manufactured by Huels, VESTAMIDL1833) by injection molding. A first O-ring was produced using binary FKM (manufactured by DAIKIN INDUSTRIES, LTD., DAI-EL DC-2270) by stamping, and a second O-ring was produced using fluorine-containing silicon rubber (FVMQ) (manufactured by SHIN-ETSU CHEMICAL CO., LTD., FE251K-u). The first O-ring (inner diameter of 7.65 mm) was mounted on the inner radius surface, at the hose insert portion side, in the container portion of the aforementioned housing section, and the second O-ring (inner diameter of 7.65 mm) was mounted on the inner radius surface, at the outlet side, in the aforementioned container portion, so that a quick connector shown in FIG. 1 was produced.

Production of Hose Device for Fuel Transportation

The aforementioned hose main body was used. The aforementioned quick connectors were mounted on this hose main body by inserting the hose insertion portion of the quick connector into each of both end portions of the hose main body and, therefore, a hose device for fuel transportation was produced.

COMPARATIVE EXAMPLE 2

PA11 (manufactured by ATOFINA JAPAN K.K., BESN BLACK P20TL) was prepared. This PA11 was extruded with an extruder and, therefore, a hose main body (inner diameter of 6 mm and thickness of 1 mm) having a single-layer structure was produced.

Production of Hose Device for Fuel Transportation

The aforementioned quick connectors produced in Comparative example 1 were mounted on the aforementioned hose main body by inserting the hose insertion portion of the quick connector into each of both end portions of the hose main body and, therefore, a hose device for fuel transportation was produced.

COMPARATIVE EXAMPLE 3

Production of Hose Main Body

Ternary FKM and acrylonitrile-butadiene rubber (NBR) were prepared. Two layers were simultaneously extruded and, therefore, the innermost layer (inner diameter of 7.5 mm and thickness of 0.5 mm) and the intermediate layer (thickness of 1.0 mm) were formed. Reinforcement fibers made of polyethylene terephthalate (PET.) were wound around the perimeter of the intermediate layer, and thereafter, the outermost layer (thickness of 1.3 mm) was formed using hydrin rubber (GECO) with an extruder. subsequently, by heating the layers (at 160° C. for 60 minutes), a hose main body (outer diameter of 13.5 mm) composed of the innermost layer, intermediate layer, reinforcement fiber layer, and outermost layer was produced.

A pipe (outer diameter of 8 mm) was inserted into each of both end portions of the aforementioned hose main body, and swaging was performed with hardware so as to join the hose main body to the pipes.

Regarding the aforementioned Examples and Comparative examples, each of the characteristics of flexibility, methanol permeation resistance, methanol resistance, water resistance, non-extractability with methanol, pressure resistance, and heat resistance was measured and evaluated in accordance with the following methods. The results thereof are collectively shown in the following Table 1 and Table 2.

Flexibility

Each of the resulting hoses was wound around a cylindrical mandrel of 200 mm in diameter, and evaluation was performed based on the winding status with reference to the following criteria. That is, symbol ⊙ indicates that no problems occurred, symbol ○ indicates that although there was resistance to some extent, no problem occurred, symbol Δ indicates that although there was resistance, kink (folding) did not occur, and symbol X indicates that kink (folding) occurred.

Methanol Permeation Resistance

In accordance with SHED DBL pattern (gasoline permeation regulation in California, USA), 100% methanol was encapsulated, and each of the amounts of methanol which permeated through the hose main body and through the quick connector was measured. The amount of methanol permeation per a length of hose [1 m of hose portion (length of the portion in contact with the liquid) and engagement portions at both ends of the hose] should be 10 mg/ a length of hose / day or less. The evaluation was performed regarding each of the hose main body and the quick connector, and symbol ○ indicates that the amount was 10 mg/ a length of hose/day or less, and symbol X indicates that the amount was more than 10 mg/ a length of hose/day.

Methanol Resistance

Methanol was encapsulated, and allowed to stand at 40° C. for 240 hours. Subsequently, the hose main body and the quick connector were visually inspected with respect to remarkable degradation of properties, such as degradation due to hardening or softening, and irregular appearance. Regarding the evaluation results thereof, symbol ○ indicates that no irregularity was detected, and symbol X indicates that irregularity was detected.

Water Resistance

Pure water was encapsulated, and allowed to stand at 120° C. for 168 hours. Subsequently, the hose main body and the quick connector were visually inspected with respect to remarkable degradation of properties, such(h as degradation due to hardening or softening, and irregular appearance. Regarding the evaluation results thereof, symbol ○ indicates that no irregularity was detected, and symbol X indicates that irregularity was detected.

Non-extractability with Methanol

Pure water was encapsulated, and allowed to stand at 120° C. for 168 hours. After the standing, samples were taken from the encapsulated water, and analyses were performed with various analyzers (ion chromatography, fluorescent X-ray, and gas chromatography). Regarding the evaluation results thereof, symbol ○ indicates that the amount of the extracted materials was 1% by weight or less and the content of the extracted materials (impurities such as metal ions and sulfur compounds) was 1 ppm or less, and symbol X indicates that the amount of the extracted materials exceeded 1% by weight and the content of the extracted materials (impurities such as metal ions and sulfur compounds) exceeded 1 ppm.

Pressure Resistance

Water was flowed through the device at a pressure of 3 MPa. Regarding the evaluation results thereof, symbol ○ indicates that leakage of water or rupture did not occur, and symbol X indicates that leakage of water or rupture occurred.

Heat Resistance

The device was allowed to stand at 120° C. for 360 hours. Subsequently, water was flowed through the device at a pressure of 3 MPa. Regarding the evaluation results thereof, symbol ○ indicates that leakage of water or rupture did not occur, and symbol X indicates that leakage of water or rupture occurred.

TABLE 1

|  |  | Example | | |
|---|---|---|---|---|
|  |  | 1 | 2 | 3 |
| Flexibility | | ○ | ○ | ○ or Δ |
| Methanol permeation resistance | Hose main body | ○ | ○ | ○ |
| | Quick connector | ○ | ○ | ○ |
| Methanol resistance | | ○ | ○ | ○ |
| Water resistance | | ○ | ○ | ○ |
| Non-extractability with methanol | | ○ | ○ | ○ |
| Pressure resistance | | ○ | ○ | ○ |
| Heat resistance | | ○ | ○ | ○ |

TABLE 2

|  |  | Comparative example | | |
|---|---|---|---|---|
|  |  | 1 | 2 | 3 |
| Flexibility | | ○ | ⊚ | ⊚ |
| Methanol permeation resistance | Hose main body | ○ | X | X |
| | Quick connector | X | X | — |
| Methanol resistance | | ○ | X | ○ or Δ |
| Water resistance | | ○ | X | X |
| Non-extractability with methanol | | ○ | X | X |
| Pressure resistance | | ○ | ○ | ○ |
| Heat resistance | | ○ | ○ | ○ |

As is clear from Table 1 and Table 2, the hoses of Examples exhibit superior flexibility, both the hose main body and the quick connector have superior methanol permeation resistance, and superior methanol resistance and superior non-extractability with methanol are also achieved. Furthermore, superior water resistance, pressure resistance, and heat resistance are achieved.

On the other hand, regarding Comparative Example 1, since the quick connector is formed from PA12 which does not have methanol permeation resistance, the quick connector exhibits inferior methanol permeation resistance. Regarding comparative Example 2, since both the hose main body and the quick connector are formed from PA11 which does not have methanol permeation resistance, the hose main body and the quick connector exhibit inferior methanol permeation resistance. Furthermore, the water resistance and non-extractability with methanol are also inferior. Regarding Comparative Example 3, since the hose main body is formed from a material which does not have methanol permeation resistance, the hose main body exhibits inferior methanol permeation resistance. Furthermore, the water resistance and non-extractability with methanol are also inferior.

Regarding the innermost layer portions of the hose main bodies of the aforementioned Examples and Comparative Examples, the volume resistivity was measured in accordance with the following method. As a result, regarding Examples 1 and 2 and Comparative Example 1, in which a conductive material was compounded as the material for forming the innermost layer, excellent results were achieved. On the other hand, regarding Examples 3 and 4 and Comparative Examples 2 and 3, in which no conductive material was compounded, inferior results were exhibited.

Volume Resistivity

The volume resistivity of the innermost layer portion of the hose main body was measured in conformity with JIS K 6911 at an applied voltage of 100 V. As a result, a portion having a volume resistivity of $10^6 \Omega \cdot cm$ or less was evaluated to be excellent, and a portion having a volume resistivity exceeding $10^6 \Omega \cdot cm$ was evaluated to be inferior.

As described above, the hose device for fuel transportation according to the present invention is provided with the hose main body, in which at least the innermost layer is made of the resin having methanol permeation resistance, and the nearly cylindrical quick connector mounted on at least one end portion of the hose main body. In the aforementioned quick connector, the housing section is formed from a material having methanol permeation resistance, the first O-ring composed of at least one of fluororubber and ethylene-propylene rubber is mounted on the inner radius surface, at the hose insert portion side, in the container portion of the housing section for containing an engagement target member, and the second O-ring composed of butyl rubber is mounted on the inner radius surface, at the outlet side, in the aforementioned container portion. As a consequence, each of the hose main body and the quick connector exhibits superior methanol permeation resistance, methanol resistance, non-extractability with methanol, and water resistance, and since two kinds of O-rings are provided in the container portion of the quick connector, the joint portion of the hose and quick connector also has methanol resistance, and in addition to this, high airtightness. Therefore, the intended objects have been accomplished, and the present invention has been achieved.

When the material having methanol permeation resistance and constituting the aforementioned housing section is a stainless steel, the methanol permeation resistance is further improved.

When the aforementioned first O-ring is formed from ethylene-propylene rubber produced by peroxide vulcanization without the use of zinc oxide, extraction of zinc by methanol does not come about, and occurrence of such a problem as the degradation of performance of the reformer due to poisoning with the extracted materials can be suppressed.

When the aforementioned first O-ring is formed from ternary fluororubber having a fluorine content of 69% by weight or more, the swelling of the fluororubber (FKM) with methanol is suppressed, superior sealing property can be stably ensured, and in addition to these, the poisoning of the reformer can be suppressed because the FKM has superior non-extractability.

When the resin having methanol permeation resistance and constituting the aforementioned hose main body is a fluororesin, the methanol permeation resistance is further improved.

When the aforementioned hose main body is a hose having a three-layer structure, in which the innermost layer is composed of conductive ethylene-tetrafluoroethylene copolymer, the intermediate layer is composed of non-conductive ethylene-tetrafluoroethylene copolymer, and the outermost layer is composed of polyamide, problems which may be brought about by static electricity generated when methanol flows may be avoided.

What is claimed is:

1. A hose device for fuel transportation comprising a hose main body, in which at least the innermost layer comprises a resin having methanol permeation resistance, and a quick connector mounted on at least one end portion of the hose main body, wherein:

the quick connector comprises a nearly cylindrical housing section and a pair of O-rings;

the housing section comprises a material having methanol permeation resistance, one end portion of the housing section is formed as an insert portion to be inserted into the hose main body, and the other end portion is formed as a container portion for containing an engagement target member therein;

a first O-ring of the pair of O-rings comprises at least one of fluororubber and ethylene-propylene rubber, and is mounted on an inner radius surface, at the hose insert portion side, in the container portion; and a second O-ring of the pair of O-rings comprises butyl rubber, and is mounted on an inner radius surface, at the outlet side, in the container portion.

2. The hose device for fuel transportation according to claim 1, wherein the material having methanol permeation resistance and constituting the housing section is a stainless steel.

3. The hose device for fuel transportation according to claim 1, wherein the first O-ring comprises ethylene-propylene rubber produced by peroxide vulcanization without the use of zinc oxide.

4. The hose device for fuel transportation according to claim 2, wherein the first O-ring comprises ethylene-propylene rubber produced by peroxide vulcanization without the use of zinc oxide.

5. The hose device for fuel transportation according to claim 1, wherein the first O-ring comprises ternary fluororubber having a fluorine content of 69% by weight or more.

6. The hose device for fuel transportation according to claim 2, wherein the first O-ring comprises ternary fluororubber having a fluorine content of 69% by weight or more.

7. The hose device for fuel transportation according to claim 1, wherein the resin having methanol permeation resistance and constituting the hose main body is a fluororesin.

8. The hose device for fuel transportation according to claim 2, wherein the resin having methanol permeation resistance and constituting the hose main body is a fluororesin.

9. The hose device for fuel transportation according to claim 3, wherein the resin having methanol permeation resistance and constituting the hose main body is a fluororesin in.

10. The hose device for fuel transportation according to claim 4, wherein the resin having methanol permeation resistance and constituting the hose main body is a fluororesin in.

11. The hose device for fuel transportation according to claim 5, wherein the resin having methanol permeation resistance and constituting the hose main body is a fluororesin.

12. The hose device for fuel transportation according to claim 6, wherein the resin having methanol permeation resistance and constituting the hose main body is a fluororesin.

13. The hose device for fuel transportation according to claim 1, wherein the hose main body has a three-layer structure, in which an innermost layer comprises conductive ethylene-tetrafluoroethylene copolymer, an intermediate layer comprises non-conductive ethylene-tetrafluoroethylene copolymer, and an outermost layer comprises polyamide.

14. The hose device for fuel transportation according to claim 2, wherein the hose main body has a three-layer structure, in which an innermost layer comprises conductive ethylene-tetrafluoroethylene copolymer, an intermediate layer comprises non-conductive ethylene-tetrafluoroethylene copolymer, and an outermost layer comprises polyamide.

15. The hose device for fuel transportation according to claim 3, wherein the hose main body has a three-layer structure, in which an innermost layer comprises conductive ethylene-tetrafluoroethylene copolymer, an intermediate layer comprises non-conductive ethylene-tetrafluoroethylene copolymer, and an outermost layer comprises polyamide.

16. The hose device for fuel transportation according to claim 4, wherein the hose main body has a three-layer structure, in which an innermost layer comprises conductive ethylene-tetrafluoroethylene copolymer, an intermediate layer comprises non-conductive ethylene-tetrafluoroethylene copolymer, and an outermost layer comprises polyamide.

17. The hose device for fuel transportation according to claim 5, wherein the hose main body has a three-layer structure, in which an innermost layer comprises conductive ethylene-tetrafluoroethylene copolymer, an intermediate layer comprises non-conductive ethylene-tetrafluoroethylene copolymer, and an outermost layer comprises polyamide.

18. The hose device for fuel transportation according to claim 6, wherein the hose main body has a three-layer structure, in which an innermost layer comprises conductive ethylene-tetrafluoroethylene copolymer, an intermediate layer comprises non-conductive ethylene-tetrafluoroethylene copolymer, and an outermost layer comprises polyamide.

19. The hose device for fuel transportation according to claim 7, wherein the hose main body has a three-layer structure, in which an innermost layer comprises conductive ethylene-tetrafluoroethylene copolymer, an intermediate layer comprises non-conductive ethylene-tetrafluoroethylene copolymer, and an outermost layer comprises polyamide.

20. The hose device for fuel transportation according to claim 8, wherein the hose main body has a three-layer structure, in which an innermost layer comprises conductive ethylene-tetrafluoroethylene copolymer, an intermediate layer comprises non-conductive ethylene-tetrafluoroethylene copolymer, and an outermost layer comprises polyamide.

21. The hose device for fuel transportation according to claim 9, wherein the hose main body has a three-layer structure, in which an innermost layer comprises conductive ethylene-tetrafluoroethylene copolymer, an intermediate layer comprises non-conductive ethylene-tetrafluoroethylene *copolymer, and an outermost layer comprises polyamide.

22. The hose device for fuel transportation according to claim 10, wherein the hose main body has a three-layer structure, in which an innermost layer comprises conductive ethylene-tetrafluoroethylene copolymer, an intermediate layer comprises non-conductive ethylene-tetrafluoroethylene copolymer, and an outermost layer comprises polyamide.

23. The hose device for fuel transportation according to claim 11, wherein the hose main body has a three-layer structure, in which an innermost layer comprises conductive ethylene-tetrafluoroethylene copolymer, an intermediate layer comprises non-conductive ethylene-tetrafluoroethylene copolymer, and an outermost layer comprises polyamide.

24. The hose device for fuel transportation according to claim 12, wherein the hose main body has a three-layer structure, in which an innermost layer comprises conductive ethylene-tetrafluoroethylene copolymer, an intermediate layer comprises non-conductive ethylene-tetrafluoroethylene copolymer, and an outermost layer comprises polyamide.

* * * * *